US007816875B2

(12) United States Patent
Taheri et al.

(10) Patent No.: US 7,816,875 B2
(45) Date of Patent: Oct. 19, 2010

(54) HIGH TORQUE GEARLESS ACTUATION AT LOW SPEEDS FOR SWING GATE, ROLL-UP GATE, SLIDE GATE, AND VEHICULAR BARRIER OPERATORS

(75) Inventors: Hassan Taheri, Dana Point, CA (US); Jonathan Becerra, Cypress, CA (US)

(73) Assignee: Viking Access Systems, LLC, Irvine, CA (US)

( * ) Notice: Subject to any disclaimer, the term of this patent is extended or adjusted under 35 U.S.C. 154(b) by 374 days.

(21) Appl. No.: 12/019,305

(22) Filed: Jan. 24, 2008

(65) Prior Publication Data

US 2009/0189560 A1 Jul. 30, 2009

(51) Int. Cl.
*H02K 21/00* (2006.01)

(52) U.S. Cl. .......................... 318/253; 310/178; 49/28; 49/321; 49/334; 49/32; 49/199

(58) Field of Classification Search ................ 318/253; 310/178; 49/28, 321, 334, 32, 118, 139, 49/167, 199
See application file for complete search history.

(56) References Cited

U.S. PATENT DOCUMENTS 3,652,124 A * 3/1972 Tronville ................ 296/146.4
3,658,373 A * 4/1972 Elkow et al. .............. 294/68.3
3,799,115 A * 3/1974 Fullerton et al. ........... 119/510
3,878,646 A * 4/1975 Crocker ...................... 49/326
4,340,799 A 7/1982 Ueda et al.
4,420,703 A 12/1983 Adam et al.
4,450,545 A 5/1984 Kishi
4,501,012 A 2/1985 Kishi
4,556,994 A 12/1985 Kawasaki
4,630,395 A 12/1986 Nasatka
4,673,848 A 6/1987 Hagiwara et al.
4,684,853 A 8/1987 Coash
4,937,855 A 6/1990 McNab
4,986,331 A * 1/1991 Henkenjohann ........... 160/201
5,134,350 A 7/1992 Mahoney
5,744,896 A 4/1998 Kessinger, Jr. et al.
6,025,685 A * 2/2000 Parsadayan ................ 318/471
6,161,005 A 12/2000 Pinzon
6,239,569 B1 5/2001 Fitzgibbon et al.
6,283,531 B1 * 9/2001 Tanigawa et al. ........... 296/103

(Continued)

OTHER PUBLICATIONS www.konarka.com, website, Mar. 5, 2007.

(Continued)

*Primary Examiner*—Rita Leykin
(74) *Attorney, Agent, or Firm*—Jafari Law Group, Inc.; David V. Jafari

(57) ABSTRACT

The invention is a system for gearless operation of a movable barrier utilizing Lorentz forces, and in particular, a movable barrier operator retrofitted with a gearless motor capable of high torque at very low speeds. Eliminating a gear system in accordance with the present invention lowers maintenance requirements, increases efficiency, and streamlines operation of any movable barrier. By utilizing a motor which produces high-torque at low a speeds a system in accordance with the present invention does away with the need for complicated gears and pulley systems in order to achieve control of movable barriers. The present invention allows manufacturers, distributors and consumers to implement movable barrier systems with much more versatility and efficiency.

1 Claim, 10 Drawing Sheets

U.S. PATENT DOCUMENTS

| | | | |
|---|---|---|---|
| 6,525,659 B2 | 2/2003 | Jaffe et al. | |
| 6,532,038 B1 | 3/2003 | Haring et al. | |
| 6,614,200 B2 | 9/2003 | Fowler et al. | |
| 6,618,993 B2 | 9/2003 | Burke | |
| 6,624,400 B2 | 9/2003 | Chun | |
| 6,788,386 B2 | 9/2004 | Cox et al. | |
| 6,832,076 B2 | 12/2004 | Study et al. | |
| 6,882,715 B2 | 4/2005 | Hom | |
| 6,909,215 B2 * | 6/2005 | Bryant | 310/114 |
| 6,933,843 B1 | 8/2005 | Hom et al. | |
| 6,966,147 B2 | 11/2005 | Solowiej | |
| 6,998,977 B2 | 2/2006 | Gregori et al. | |
| 7,042,183 B2 | 5/2006 | Fitzgibbon et al. | |
| 7,057,547 B2 | 6/2006 | Olmsted et al. | |
| 7,062,879 B2 | 6/2006 | Wenzl et al. | |
| 7,064,505 B2 | 6/2006 | Sato | |
| 7,116,072 B1 | 10/2006 | Murray et al. | |
| 7,138,912 B2 | 11/2006 | Fitzgibbon et al. | |
| 7,170,248 B2 | 1/2007 | Tsui et al. | |
| 7,170,998 B2 | 1/2007 | McLintock et al. | |
| 7,194,412 B2 | 3/2007 | Mays | |
| 7,197,278 B2 | 3/2007 | Harwood et al. | |
| 7,208,897 B2 | 4/2007 | Hotto et al. | |
| 7,264,417 B1 | 9/2007 | Nasatka | |
| 7,436,141 B2 | 10/2008 | Perez | |
| 7,677,636 B2 * | 3/2010 | Bosse | 296/108 |
| 2002/0067245 A1 | 6/2002 | Campbell | |
| 2003/0015889 A1 | 1/2003 | Stolle et al. | |
| 2003/0034750 A1 * | 2/2003 | Hom | 318/445 |
| 2003/0102751 A1 * | 6/2003 | Bryant | 310/112 |
| 2003/0197914 A1 | 10/2003 | Cox et al. | |
| 2004/0222913 A1 | 11/2004 | Olmsted et al. | |
| 2004/0239496 A1 | 12/2004 | Fitzgibbon et al. | |
| 2005/0034374 A1 | 2/2005 | Ebbe et al. | |
| 2005/0052080 A1 * | 3/2005 | Maslov et al. | 307/10.1 |
| 2005/0253731 A1 | 11/2005 | Fitzgibbon et al. | |
| 2005/0258934 A1 | 11/2005 | Buck | |
| 2005/0263099 A1 * | 12/2005 | Gerig et al. | 119/719 |
| 2005/0288840 A1 | 12/2005 | Suzuki | |
| 2006/0213362 A1 | 9/2006 | Heertjes et al. | |
| 2006/0237150 A1 | 10/2006 | Olmsted | |
| 2007/0035074 A1 | 2/2007 | Vervoordeldonk et al. | |
| 2007/0052946 A1 | 3/2007 | Heiland | |
| 2007/0093943 A1 | 4/2007 | Nelson et al. | |
| 2007/0146675 A1 | 6/2007 | Butler | |
| 2007/0188724 A1 | 8/2007 | Jacobs et al. | |
| 2007/0222401 A1 | 9/2007 | Trumper et al. | |
| 2008/0061948 A1 | 3/2008 | Perez | |
| 2008/0094186 A1 | 4/2008 | Perez | |
| 2008/0106370 A1 | 5/2008 | Perez | |
| 2009/0085719 A1 | 4/2009 | Perez | |
| 2009/0188166 A1 | 7/2009 | Taheri | |

OTHER PUBLICATIONS

Viking Access Systems, “Vehicle Gate Operator Q-4” Feb. 2007; Retrieved from Internet <http://web.archive.org/web/20070630124920/http://vikingaccess.com/Q4.html> p. 1.

Birkett, John; Pringle, Michael; “Open n Shut”; Autumn 2007; 16 pages; aesif.org.uk.

Viking Access Systems, “Vehicle Gate Operator Q-4”, Feb. 2007; Retrieved from internet <URL:http://web.archive.org/web/20070630124920/http://vikingaccess.com/Q4.html> p. 1.

* cited by examiner

HIGH TORQUE GEARLESS ACTUATION AT LOW SPEEDS FOR SWING GATE, ROLL-UP GATE, SLIDE GATE, AND VEHICULAR BARRIER OPERATORS

TECHNICAL FIELD OF THE INVENTION

The present invention relates in general to a system for gearless operation of a movable barrier utilizing Lorentz forces, and in particular, a movable barrier operator retrofitted with a gearless motor capable of high torque at very low speeds. Eliminating a gear system in accordance with the present invention lowers maintenance requirements, increases efficiency, and streamlines operation of movable barriers.

BACKGROUND OF THE INVENTION

Typically, automatic and manual operation of movable barriers, such as garage doors or gates, has included a gear system which allows for easy movement of a barrier. Many developments in the gate operator industry have transformed movable barriers, including the implementation of various kinds of motors and gear systems to operate one or more gates. For example, in the past, movable barrier systems have included AC induction motors, DC brush motors, and DC brushless motors.

One of the problems encountered in the gate operator industry is controlling actuation to achieve smooth, efficient, and effective operation of movable barriers. The current practice, which utilizes motors such as AC induction motors, must implement various complex systems of gears and electronics in order to provide the adequate amount of power at the correct speed.

For example, systems with conventional motors usually include phase control mechanisms to monitor and alter the frequency of voltage applied to the motor—furthermore these motors fail to provide high torque at low speeds. DC brush motors present the advantage that speed may be controlled in a linear fashion in relation to the voltage applied, however, these motors lose the desired torque at very low speeds. And although DC brushless motors also provide the same speed control, the DC brushless motor also fails to provide the desired high torque at very low speeds.

The gate operation industry has therefore implemented the use of a gear box or a belt system to accomplish the torque required to move a particular barrier. These complex systems seek to regulate smooth actuation but remain inadequate to retain linear control of speed while optimizing the correct amount of torque necessary to perform a particular task.

Adding belts, chains or gear boxes increases the volume of the system, adding more moving parts and essentially additional variables for possible system malfunctions. Manufacturers in the gate operation industry have attempted to alleviate this problem but those methods remain inadequate for the following reasons.

Some manufacturers have tried to implement c-phase mounting techniques between a motor and the gear box, however, this method raises the possibility of oil or grease leakage that may damage a gate operating system.

Other manufacturers have tried to minimize the number of components in a gate operating system by implementing a motor-gear head device to minimize potential problems during assembly. However, gear boxes, with oil or grease that may eventually leak, are still required and thus present the problem of potential damage and higher maintenance requirements.

Alternatively, other manufacturers have implemented a planetary gear system in their designs. This gear system presents the advantage of very small gearing capable of providing high torque, however, their need for oil or grease still requires higher maintenance to prevent damage from its lubricants.

Yet perhaps the most significant problem presented by the use of gear systems is the fact that gear systems do not provide 100% efficiency. In fact, it is commonly known in the industry that such gearing systems provide efficiency levels raging from 40% to 90% depending on the quality of the system used; notably, the more efficient gear systems are costly.

Due to the inadequate methods and systems used to operate movable barriers (particularly in industrial applications), the gate operation industry is flooded with gate operators that are large, heavy, and complex—which require relatively large motors and big gear boxes. For these reasons and others, the prior art has been inadequate to suit the needs of gate operator users, installers and manufacturers.

Therefore, there is a need in the art for a system that utilizes fewer components to achieve higher precision actuation of movable barriers without complex gear systems and electronics. It is desirable to develop a movable barrier operator that contains fewer parts to minimize maintenance and potential malfunctions, while retaining the desired control of the operator at low speeds and generating the desired high torque during actuation. It is to these ends that the present invention has been developed.

SUMMARY OF THE INVENTION

To minimize the limitations in the prior art, and to minimize other limitations that will be apparent upon reading and understanding the present specification, the present invention describes a system for gearless operation of a movable barrier utilizing Lorentz forces.

The present invention focuses on a system for gearless operation of movable barriers utilizing Lorentz forces, and in particular, movable barrier operators retrofitted with a gearless motor capable of high torque at very low speeds. By eliminating a gear system, in accordance with the present invention, lower maintenance requirements may be achieved, efficiency may be increased significantly, and a more compact design streamlines operation of movable barriers.

A swing gate operation system capable of high-torque actuation at low speeds, in accordance with the present invention, comprises a movable barrier, wherein said movable barrier is adapted to swing open and swing close, and a gearless motor directly coupled to said movable barrier in a manner that said movable barrier swings at substantially the same angular speed as a rotation of said gearless motor.

A roll-up gate operation system capable of high-torque actuation at low speeds, in accordance with the present invention, comprises a roll-up gate, a drive mechanism for said roll-up gate, a gearless motor coupled to said drive mechanism in a manner that said roll-up gate moves at a similar speed as a rotation speed of said gearless motor.

A movable barrier operation system capable of high-torque actuation at low speeds, in accordance with the present invention, comprises a movable barrier, a base, wherein said base is supported by a support beam, and said support beam is adapted to adjust a height of said base, and a gearless motor mounted on said base, wherein an output shaft of said gearless motor is directly coupled to said movable barrier so that said movable barrier moves at a similar same speed as a rotation speed of said motor.

A chassis-less vehicular movable barrier operating system capable of high-torque actuation at low speeds, in accordance with the present invention, comprises a vehicular movable barrier, a gearless motor, wherein an output shaft of said gearless motor is directly coupled to the vehicular movable barrier in a manner that said vehicular movable barrier moves at a substantially similar speed as a rotation speed of said gearless motor.

A method for gearless operation of a slide gate capable of high torque actuation at slow speeds, in accordance with the present invention, comprises adapting a frame member to support a Lorentz force motor, attaching said Lorentz force motor directly to a slide gate so that said swing gate moves at a substantially similar speed as a rotation speed of said Lorentz force motor, adapting a controller to control said rotation of said Lorentz force motor, connecting a sensor to said controller, said sensor adapted to generate a signal after detecting a predefined event, retrofitting said Lorentz force motor with a sprocket, wherein said sprocket is rotably coupled to said Lorentz force motor, attaching a chain to said sprocket, attaching an idle wheel for maintaining said chain mechanically connected to said sprocket, wherein said chain runs parallel to a track, and wherein said chain is adapted to transfer a mechanical force generated by said Lorentz motor to said slide gate, and adapting said slide gate to move on said track.

A method for gearless operation of a swing gate capable of high torque actuation at slow speeds, in accordance with the present invention comprises, attaching a Lorentz motor directly to a movable barrier so that said movable barrier moves at a substantially similar speed as a rotation speed of said motor, attaching an articulated arm to an output shaft of said Lorentz motor, said articulated arm adapted to swing open and swing close said movable barrier, adapting a controller to control said rotation of said Lorentz motor, connecting a sensor to said controller, said sensor adapted to generate a signal after detecting a predefined event, creating a cavity positioned approximately underneath a ground level in relation to said movable barrier, and adapting a casing for housing said Lorentz motor in said cavity.

It is an objective of the present invention to implement Lorentz force motors into movable barrier operators to preserve energy efficiency.

It is another objective of the present invention to eliminate the need for gearing systems for high torque operations at low speeds.

Finally, it is yet another objective of the present invention to provide a movable barrier operation system with minimal components and high versatility—applicable to a wide variety of applications.

These and other advantages and features of the present invention are described herein with specificity so as to make the present invention understandable to one of ordinary skill in the art.

DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 2(*b*) is a block diagram illustrating how implementation of a Lorentz force motor may still be implemented with a gear system in some applications.

FIG. 3(*b*) illustrates a more detailed view of the various components that comprise the embodiment shown in FIG. 3(*a*).

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the invention.

In the following detailed description, a movable barrier operator, or gate operator, can be any system that controls a barrier to an entry, an exit, or a view. The barrier could be a door for a small entity (i.e. a vehicle), or a gate for a large entity (i.e. a building) which can swing out, slide open, fold or even roll upwards. The operator which moves the barrier from an open position to a closed position and vice-versa is retrofitted with a gearless motor that utilizes Lorentz forces to actuate or operate the barrier.

Briefly, a Lorentz force motor as described in the present disclosure may be any type of motor that uses Lorentz forces. Typically, a Lorentz motor in accordance with the present invention is a gearless motor that uses electromagnetic properties to create mechanical work with minimal energy loss.

Figure 1:
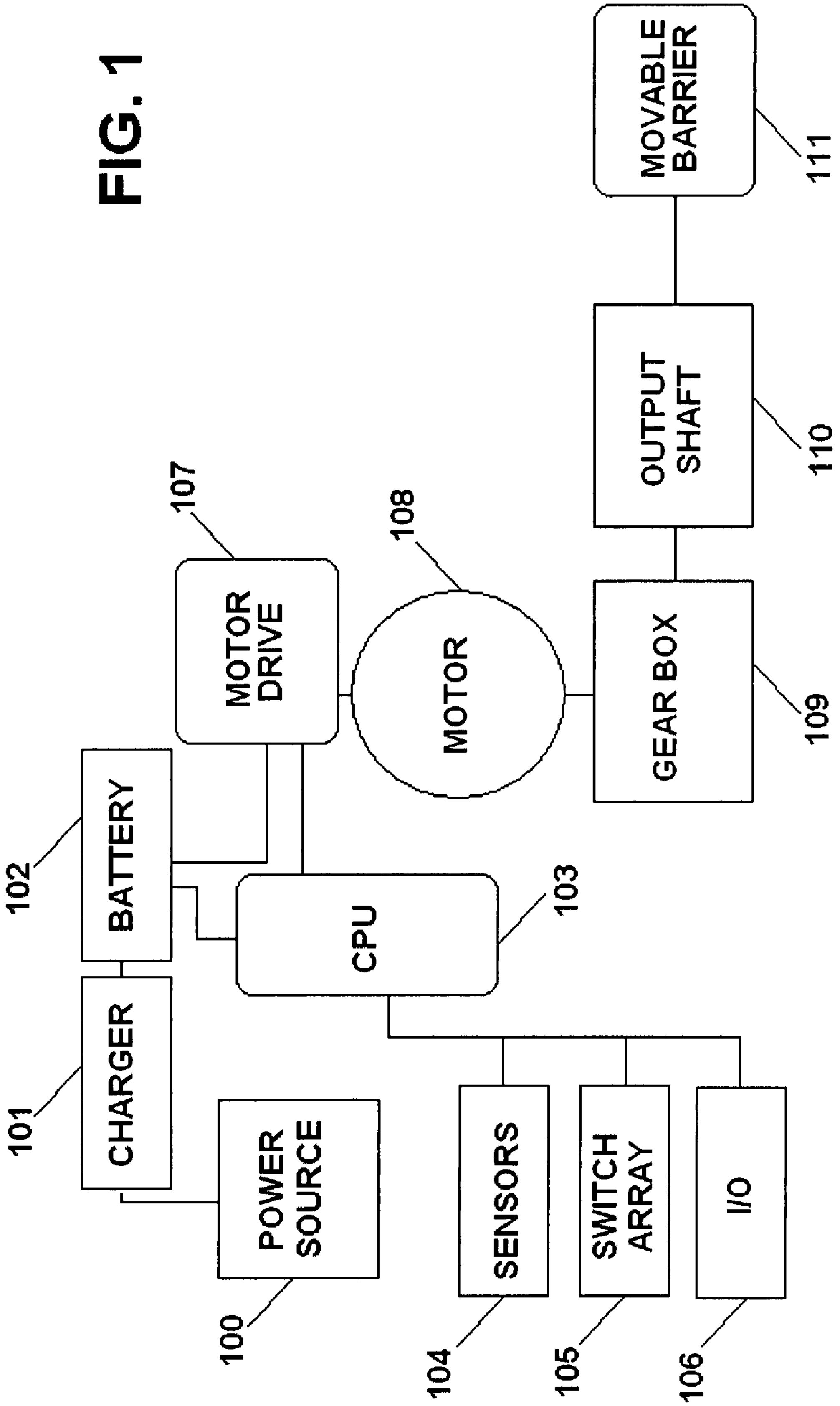
FIG. 1 is a block diagram of the various components comprising a movable barrier operator typical of the ones found in the prior art.

FIG. 1 is a block diagram of the various components comprising a movable barrier operator typical of the ones found in the prior art. Typically, the prior art (as shown) comprises of power source 100, charger 101, battery 102, controller 103, sensors 104, switch array 105, input/output interface (I/O) 106, motor drive 107, motor 108, gear box 109, and output shaft 110, which connects to and operates movable barrier 111.

By implementing a gearless motor and removing gear box 109 and output shaft 110, work efficiency may be maximized, maintenance may be significantly minimized, and with less components, the improved movable barrier operator is more versatile; a single device capable of adapting to numerous embodiments. For example, FIG. 2(*a*) is a block diagram illustrating how implementation of a Lorentz force motor eliminates the need for various components traditionally found in the prior art.

The illustrated embodiment comprises a basic system to operate movable barrier 203 without the need for additional components, for example, motor drive 107, and gear box 109. Motor 200 may be coupled directly to movable barrier 203 and wired to control box 201 where typical components to monitor and control motor 200 may be installed, including any additional features necessary to operate movable barrier 203, for example sensors 202.

The elimination of a gear box means the illustrated movable barrier operator may be implemented for a wide variety of applications. For example, and without deviating from the scope of the present invention, movable barrier operator 205, may be a swing gate operator, a window operator, a garage door operator, a slide gate operator, a roll-up door operator, a sliding-door operator, a regular door operator, a revolving door operator, a car door operator, or a car top operator for a convertible vehicle.

By eliminating the need for a gear box and even the need for a chassis to hold motor 200, motor 200 may be virtually directly coupled to any movable barrier with few modifications. Thus it is preferable that motor 200 be manufactured in a small compact size for most embodiments, however, having a larger size Lorentz motor for other applications would not deviate from the scope of the present invention, for example, motor 200 may be a large motor installed directly to a movable water barrier, wherein control box 291 and sensors 202 are part of a dam.

Figure 2A:
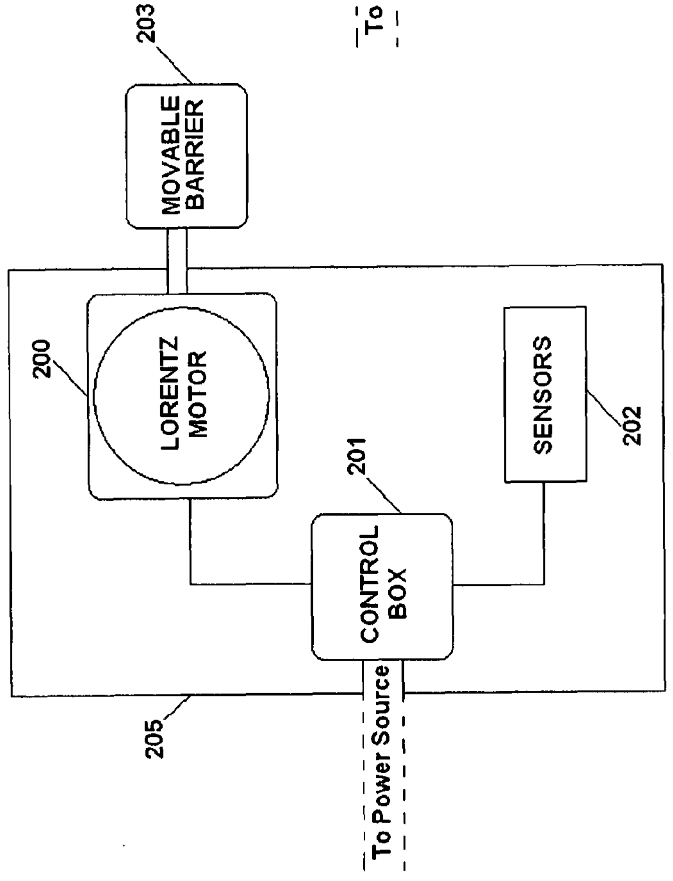
FIG. 2(*a*) is a block diagram illustrating how implementation of a Lorentz force motor eliminates the need for various components traditionally found in the prior art.
Figure 2B:
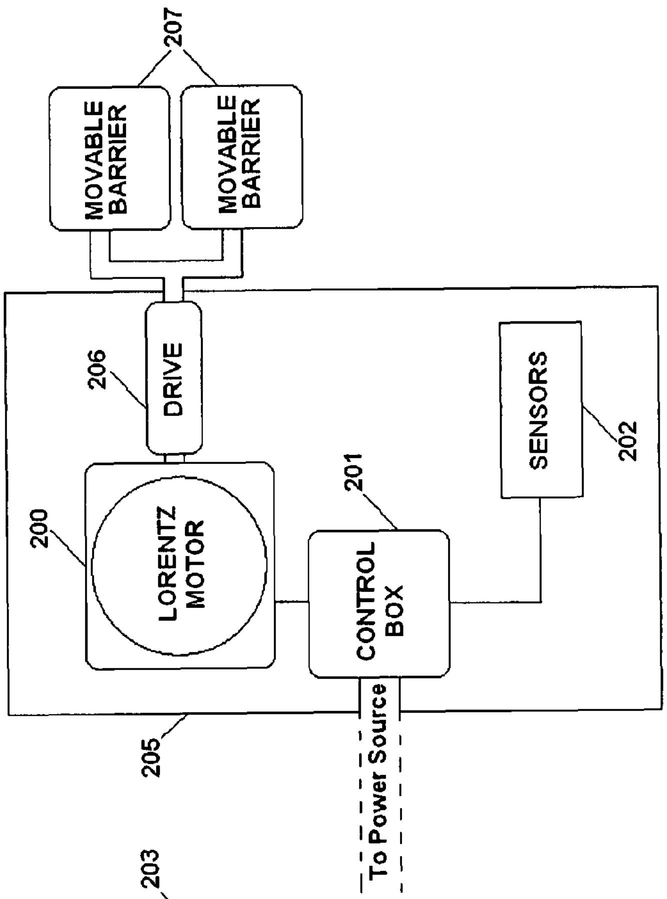

Implementing a gear box or gear system does not deviate from practice of the present invention however, and there may be some applications in which some gearing may be helpful. FIG. 2(*b*) is a block diagram illustrating how implementation of a Lorentz force motor may still be put into practice with a gear system. Motor 200 may be coupled to a gearing system or drive mechanism 206 to actuate, for example, multiple movable barriers 207.

In turn, with reference to the remaining figures, a number of examples of other various embodiments, including some examples already disclosed, will be discussed in greater detail.

Figure 3A:
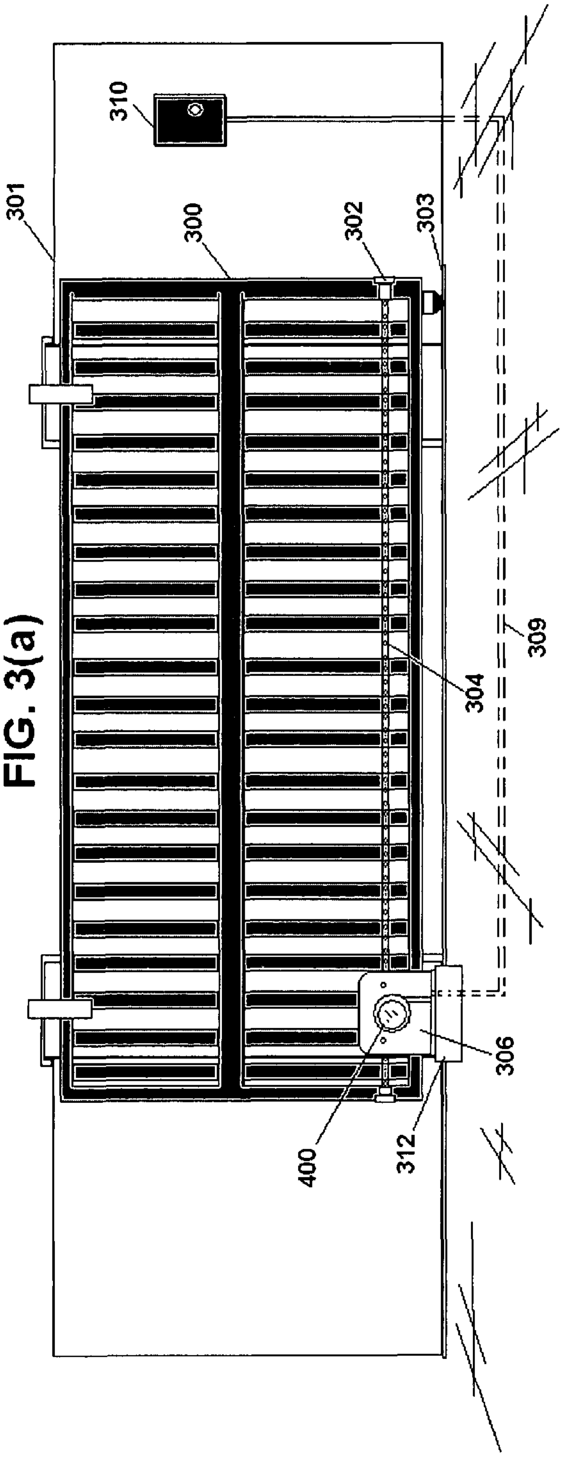
FIG. 3(*a*) illustrates one embodiment of the present invention wherein minimal equipment is used in the operation of a simple sliding gate by eliminating a gear system and implementing a Lorentz force motor with a movable barrier operator.
Figure 3B:
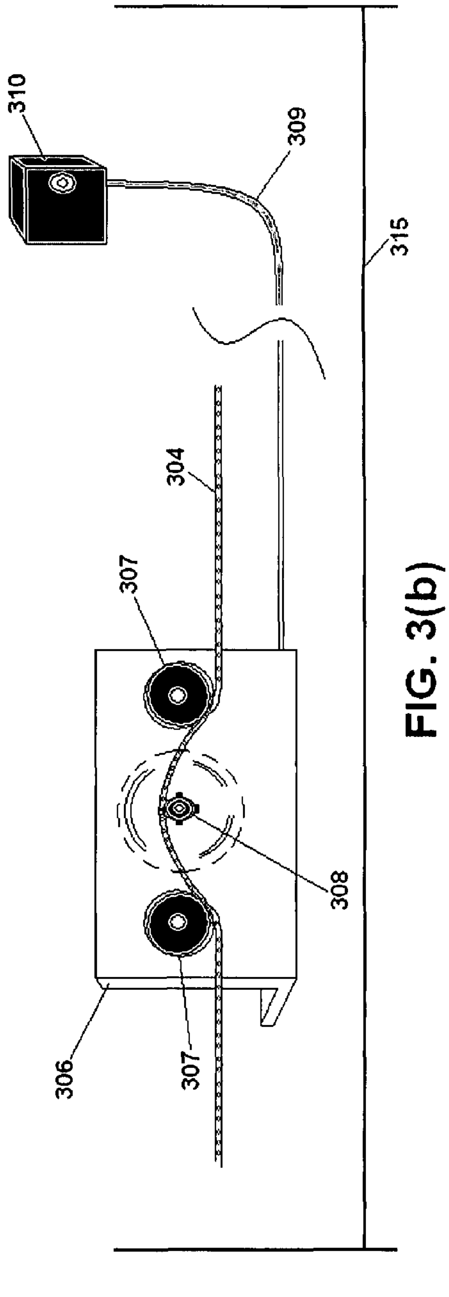

FIG. 3(*a*) illustrates one embodiment of the present invention wherein minimal equipment is used in the operation of a sliding gate by eliminating a gear system, eliminating the need for a chassis, and retrofitting a movable barrier operator with a Lorentz motor.

The illustrated embodiment comprises gate 300, gate frame 301, a simple chain bolt 302, track 303, chain 304, and frame member 306 on which motor 400 may be installed. By simply attaching frame member 306 onto an appropriate structure, for example gate frame 301, and properly installing chain 304 onto gate 300 and frame member 306, gate 300 may be configured to operate automatically without the need for heavy equipment, complex installation, or additional components such as a gear box. This set up, and controller 310 coupled to motor 400, make up gate operator 315; a simple but desirable design for applications ranging from access systems for gated communities to large scale industrial size gates.

FIG. 3(*b*) illustrates a more detailed view of the various components that comprise the embodiment shown in FIG. 3(*a*).

Typically, gate 300 travels on track 303 utilizing chain 304 to transfer the mechanical force generated by motor 400. Chain 304 may be coupled or attached to gate 300 by any appropriate means without deviating from the scope of the present invention, for example, by using chain bolt 302 to attach said chain 304 to a lower portion of gate 300.

Upon installing or mounting motor 400 onto frame member 306, motor 400 may be retrofitted with sprocket 308 so that sprocket 308 may be coupled with chain 304. Guiding wheels or idle sprockets 307 may be attached or installed onto frame member 306 in order to keep chain 304 properly mounted and coupled with sprocket 308.

Frame member 306 is typically mounted onto gate frame 301 which may be a desirable installing configuration for movable barrier operator 315. However, in an alternative embodiment, fixture 312 may be installed to support frame member 306 and chain 304 into proper place for operation of gate 300.

Typically, controller 310 is connected to motor 400 using wire conduit 309 which runs from frame member 306 to some remote location on the premise where movable barrier operator has been installed. Controller 310 serves as the means to monitor and control movable barrier operator 315 so it is typically accessible to personnel which may access controller 310. However, and without limiting the scope of the present invention, controller 310 may be mounted directly onto frame member 306.

In an exemplary embodiment, wire conduit 309 provides a direct line of communication between motor 400 and controller 310 in addition to providing movable barrier operator 315 with a power source. This configuration may be desirable to keep movable barrier operator simple to install without the need for other components.

However, and without deviating from the scope of the present invention, in another embodiment movable barrier operator 315 may be battery powered. A battery (not shown), connected to a small controller (not shown) may be installed or coupled to frame member 306. Such controller may then be able to send and receive information wirelessly thus circumventing the need for wire conduit 309 and controller 310. Notably, this embodiment would require more sophisticated technology (presently available) which may increase the cost of movable barrier 315. Furthermore, attaching a controller and battery directly to frame member 306 may require stronger materials for frame member 306 and additional maintenance to movable barrier operator 315 to for example, assure that said battery is properly charged.

Figure 4:
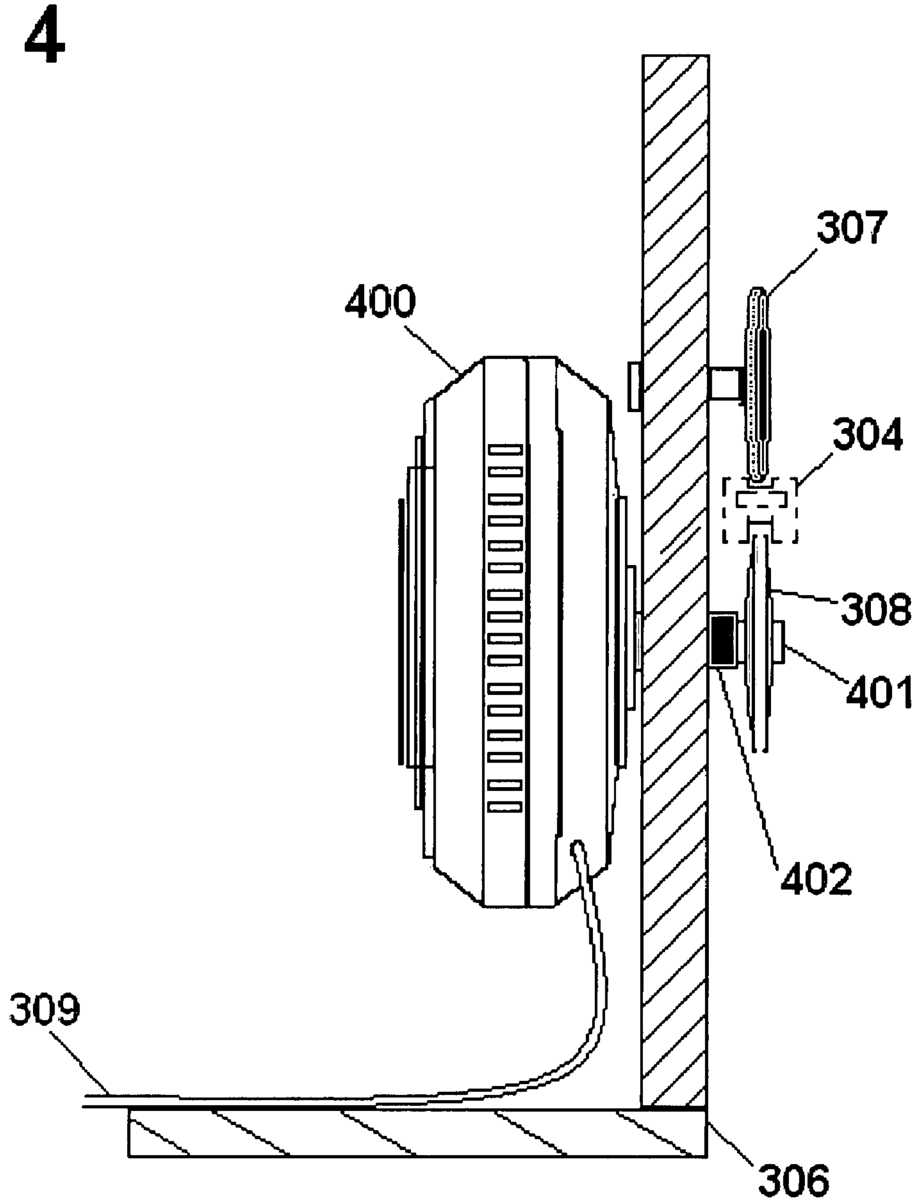
FIG. 4 illustrates a side view of the movable barrier operator shown above in FIG. 3(*a*) and FIG. 3(*b*), revealing the installation arrangement of a Lorentz force motor used to operate a movable barrier in accordance with one embodiment of the present invention.

FIG. 4 illustrates a side view of the movable barrier operator shown above in FIG. 3(*a*) and FIG. 3(*b*), revealing the installation arrangement of a Lorentz force motor used to operate a movable barrier in accordance with one embodiment of the present invention.

Frame member 306 may be made of any material strong enough to hold a small motor such as motor 400 and the additional weight of chain 304. In one embodiment a metal material is used to manufacture frame member 306 which may be drilled or retrofitted with mounting fixtures in order to allow installation of frame member 306 onto a structure, for example gate frame 301. In another embodiment, discussed below in reference to FIG. 5, frame mount 306 may be configured for universal installation on a variety of sizes of for example, gates.

In an exemplary embodiment, motor 400 is mounted on frame member 306 using support member 402. Similar devices including typical bolts (not shown) may also be used to place motor 400 securely onto frame member 306. Once mounted, frame member 306 may be placed on a base 312 to securely hold motor 400 and chain 304 so that mechanical contact is kept.

Motor 400 may be retrofitted with sprocket 308 directly on output shaft 401. As output shaft 401 is turned by motor 400, sprocket 308 and idle sprockets 307 keep chain 304 in continuous contact so that the energy produced by motor 400 is properly used as mechanical energy to move chain 304 and operate gate 300. By rotating its output shaft 401 clock-wise and counter-clockwise, motor 400 is able to move chain 304 in a horizontal plane, thus sliding gate 300 back and forth, to and from, opened and closed positions; such movement being dictated by predetermined parameters a user may program via controller 310.

It may be desirable to add a cosmetic cover to frame member 306 for aesthetic purposes. Furthermore, a cover may provide protection from exposure and keep sprocket 308, sprockets 307 and motor 400 from being damaged by for example, the weather.

Figure 5:
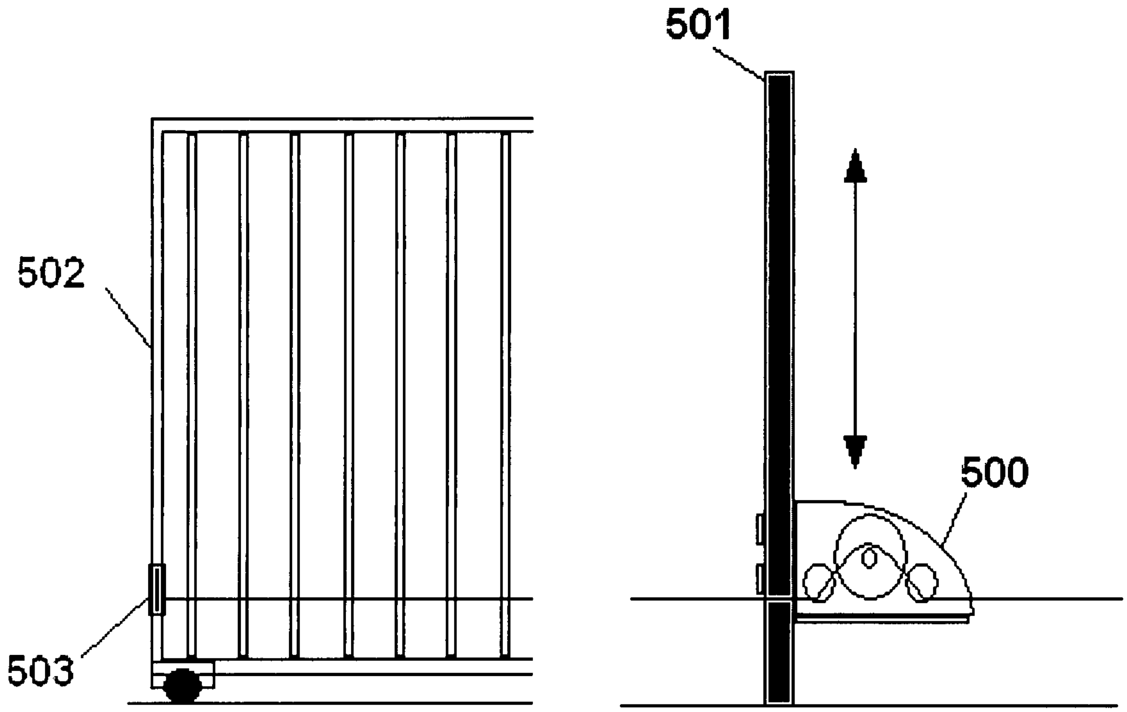
FIG. 5 illustrates one embodiment of the present invention which is easily adaptable to various shapes and sizes of barriers, for example different types of gates, due to its small size and lack of gear system.

Turning to the next figure, FIG. 5 illustrates one embodiment of the present invention that is easily adaptable to various shapes and sizes of barriers, for example different types of gates, do to its small size and lack of gear system.

Movable barrier operator 500 is similar to movable barrier 315, however, movable barrier operator 500 has been configured to be universally adaptable. As shown, movable barrier operator 500 may be installed on post 501 so as to be able to slide up and down post 501 depending on the size of gate 502 or positioning desired for a particular application.

For example, and without deviating from the scope of the present invention, gate 502 may be a gate located in a geographical are wherein harsh weather such as snow often fall. To prevent rust and damage, an installer or user may decide to mount movable barrier operator 500 at high position on post 501. Naturally, chain 504 and chain bolt 503 would need to be similarly position so as to allow proper operation of gate 501.

In another example, gate 502 is located in a luxurious gated community wherein aesthetically pleasing designs are preferred. In such embodiment movable barrier operator may be placed very low to the ground in an inconspicuous place so as to position chain 504 running along a covered foot of gate 502.

Figure 6A:
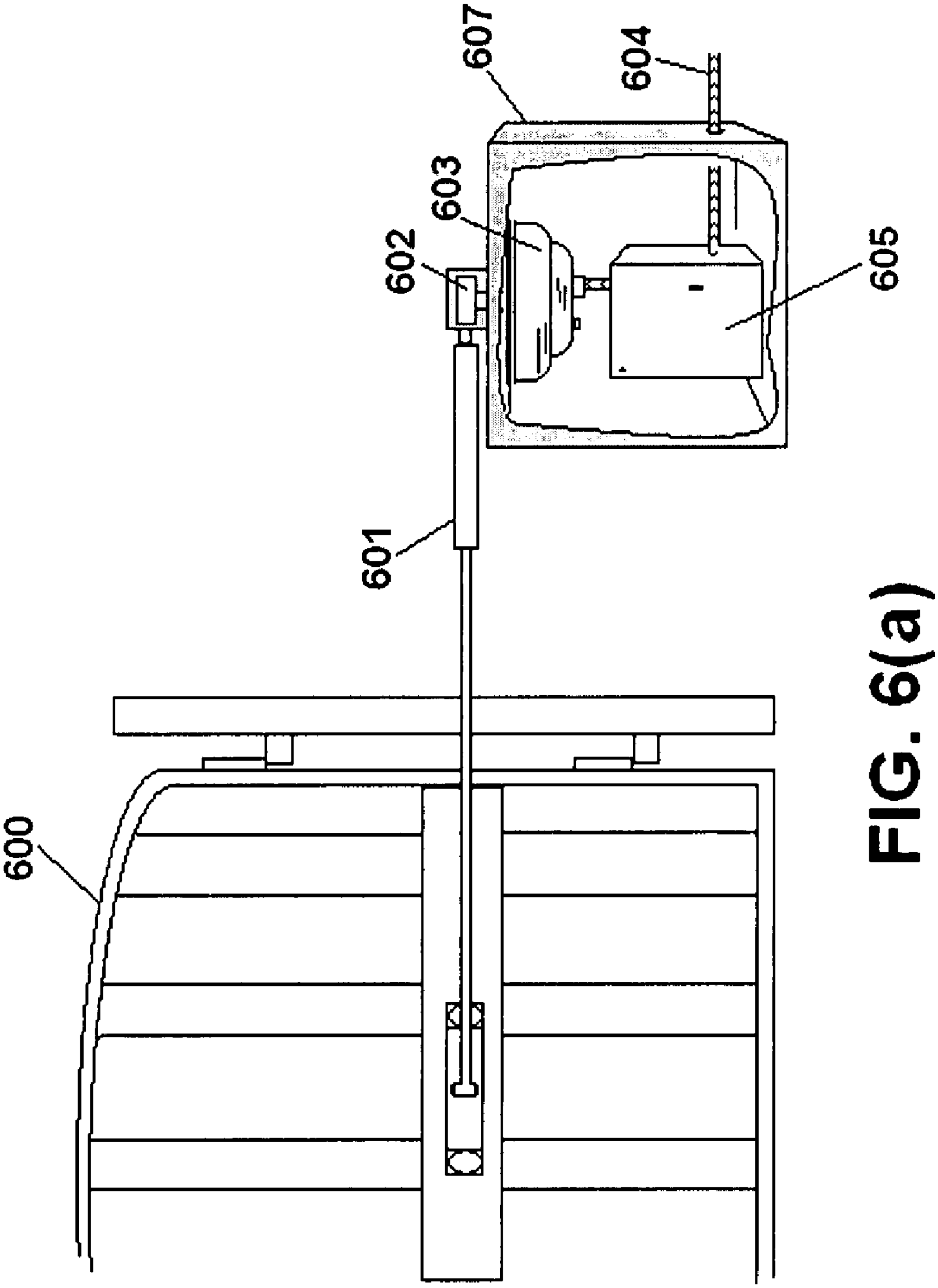
FIG. 6*a* illustrates another embodiment in which a small control box contains all necessary components for a movable barrier operator in accordance with the present invention.
Figure 6B:
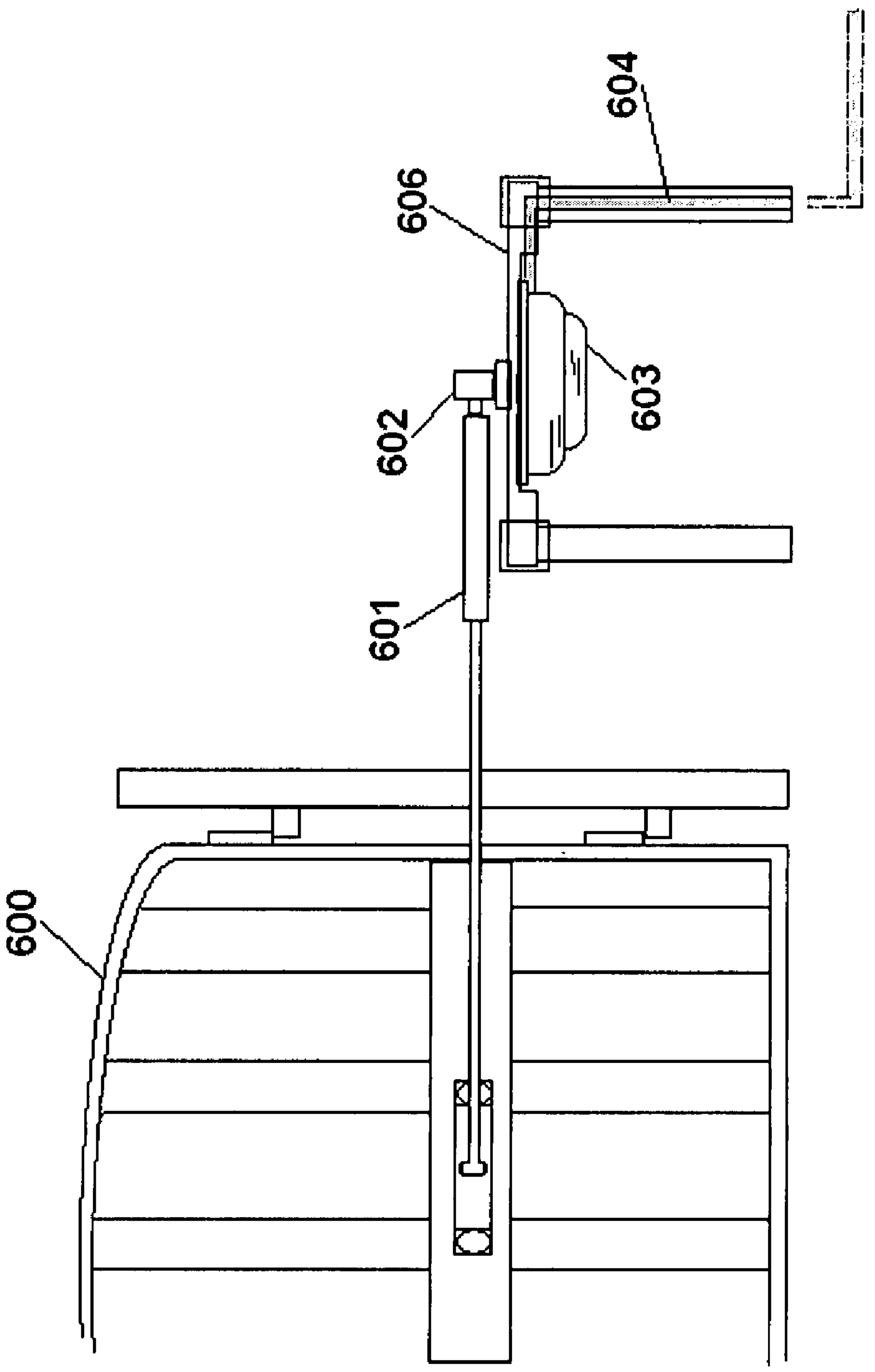
FIG. 6(*b*) illustrates a similar embodiment of the present invention wherein a motor hangs from a post.

FIG. 6(*a*) illustrates another embodiment in which a small control box contains all necessary components for a movable barrier operator, and FIG. 6(*b*) illustrates a similar embodiment of the present invention wherein a motor hangs from a post; this simpler design incorporates the use of a remote location for the controller and power source.

Both embodiments consist of gate 600, articulated arm 601, clutch 602, Lorentz motor 603, and wire conduit 604. The embodiment illustrated in FIG. 6(*a*) further comprises a control box 607 which houses controller 605 and Lorentz motor 603. This embodiment may be desirable to protect a movable barrier operator from tough conditions, for example in agricultural settings or geographical locations that experience extreme weather.

Typically control box 607 is constructed of a durable light weight material and may be easily removed for maintenance or updating controller 605's firmware.

As Lorentz motor 603 rotates, its output shaft generates mechanical energy, thus clutch 602, being attached to said Lorentz motor 603, turns articulated arm 601 to swing open gate 600. Naturally, the embodiment illustrated in FIG. 6(*b*) operates gate 600 in a similar fashion.

A desirable advantage of the later embodiment is the elimination of parts and components to operate gate 600. Instead of controller case 607, Lorentz motor 603 hangs from a support beam 606, for example a post or similarly simple fixture—this provides easy access to the motor in case a replacement is required or adjustments need to be performed. In an exemplary embodiment, support beam 606 is adjustable to allow users flexibility when installing.

Furthermore, instead of installing the controller by gate 600, controller 605 (not shown in FIG. 6(*b*)) is positioned in a remote location accessible to an installer or user. For example, and without deviating from the scope of the present invention, controller 605 is located inside a building which provides a power source (not shown) and communicates with Lorentz motor 603 for remotely monitoring or operation purposes via conduit 604.

Figure 7:
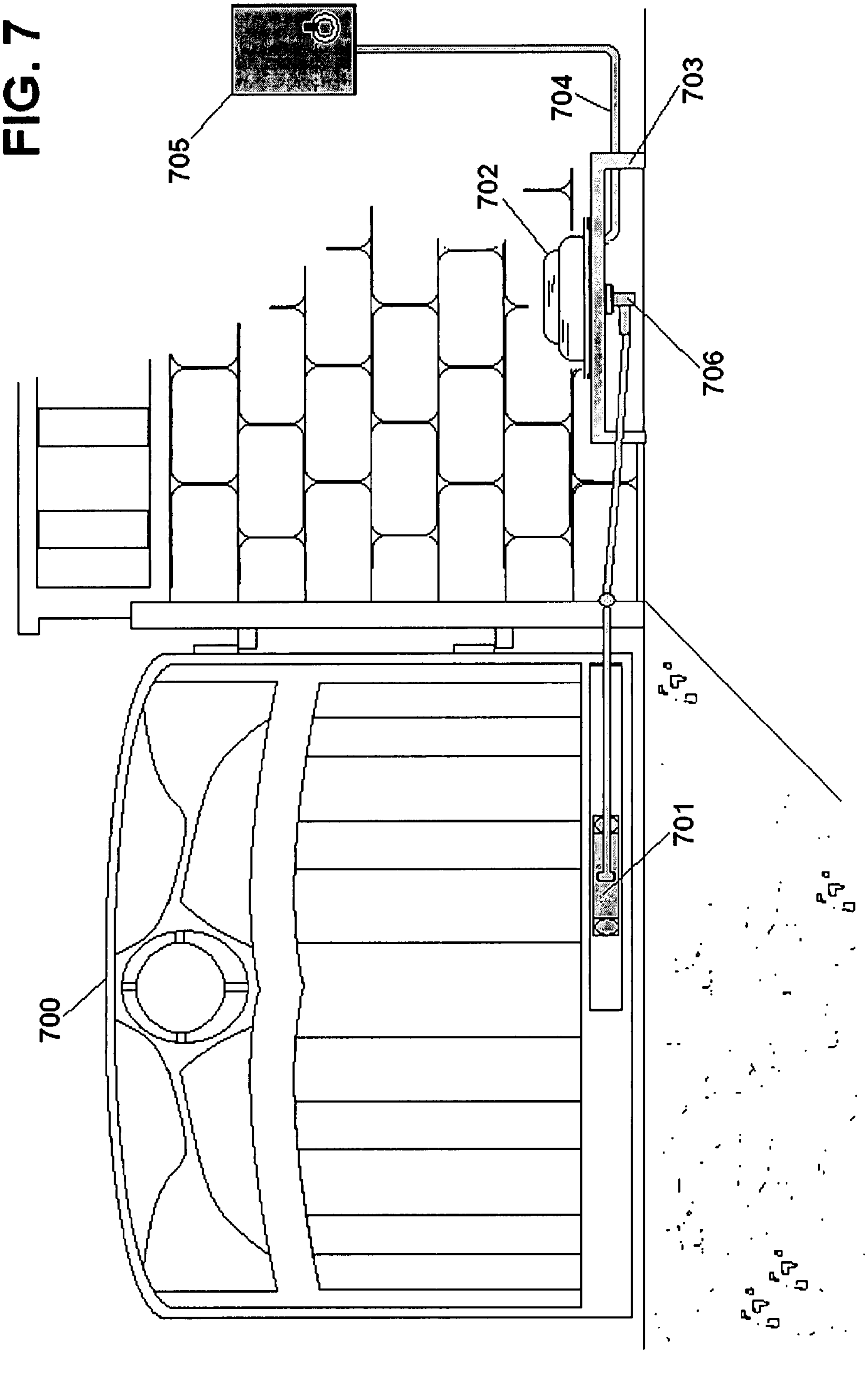
FIG. 7 illustrates yet another embodiment in accordance with the present invention, in which a movable barrier operator may be installed partly underground to avoid installing additional fixtures on a user's property and preserve aesthetic appeal.

FIG. 7 illustrates yet another embodiment in accordance with the present invention, in which a movable barrier operator may be installed very low to the ground to avoid installing large fixtures on a user's property and preserve aesthetic appeal of for example, an expensive swing gate at the entry point of a large estate. This embodiment of the present invention comprises swing gate 700, articulated arm 701, Lorentz motor 702, base 703, conduit 704, and controller 705.

Lorentz motor 702 is exposed so as to provide easy access in case of repair or replacement. A power source may be located inside a home, for example, and provided to Lorentz motor 702 via conduit 704. Similarly, controller 705 may too be located inside said home (not shown) for access by users.

Base 703 supports Lorentz motor 702 while allowing a clearance from the ground. By placing clutch 706 low to the ground, articulated arm 701 is able to operate swing gate 700 without interfering with the aesthetic appeal of swing gate 700. This configuration is very desirable in the gate industry with particular preference of clients that spend many thousands of dollars on such expensive gates, and who desire to have components such as articulated arm 701 hidden away or away from view of, for example, swing gate 700.

Since the present invention for a gearless movable gate operator eliminates the need for complex belt systems, additional gearing or voltage control systems, a user is provided with the flexibility to position, mount, or install a movable barrier operator, in accordance with the present invention, in a wide range of configurations depending on a user's needs.

Figure 8:
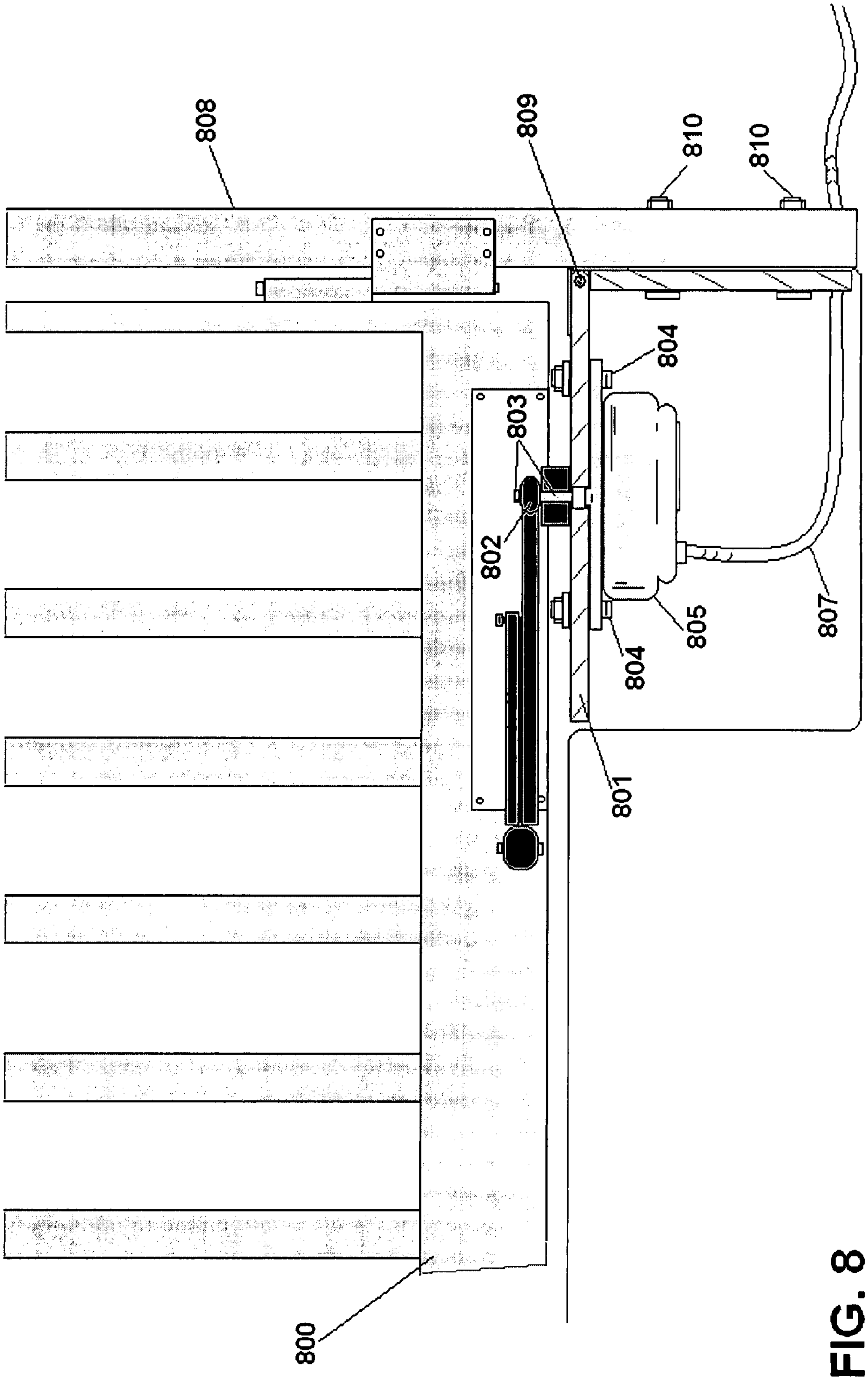
FIG. 8 illustrates yet another embodiment in accordance with the present invention wherein a movable barrier operator is installed directly to a barrier, for example a gate, without the need for gears or belt systems to optimize actuation and preserve space.

FIG. 8 illustrates yet another embodiment in accordance with the present invention wherein a movable barrier operator is coupled directly to a movable barrier, for example a gate, without the need for gears or belt systems to optimize actuation and preserve space.

Movable barrier operator 800 comprises motor 805 which has been mounted underneath gate 811. Movable barrier operator 800 further comprises casing 801 installed at least partly underground, articulated arm 802 which connects with motor 805's output shaft 803, and is supplied power from a remote source (not shown) via conduit 807.

Motor 805 is held in place against casing 801 by bolts 804; hinge 809 allows casing 801 to swing open and allow a user, for example an installer, to access motor 805. Furthermore, to add stability, casing 801 may be reinforced against post 808 via bolts 810.

Figure 9:
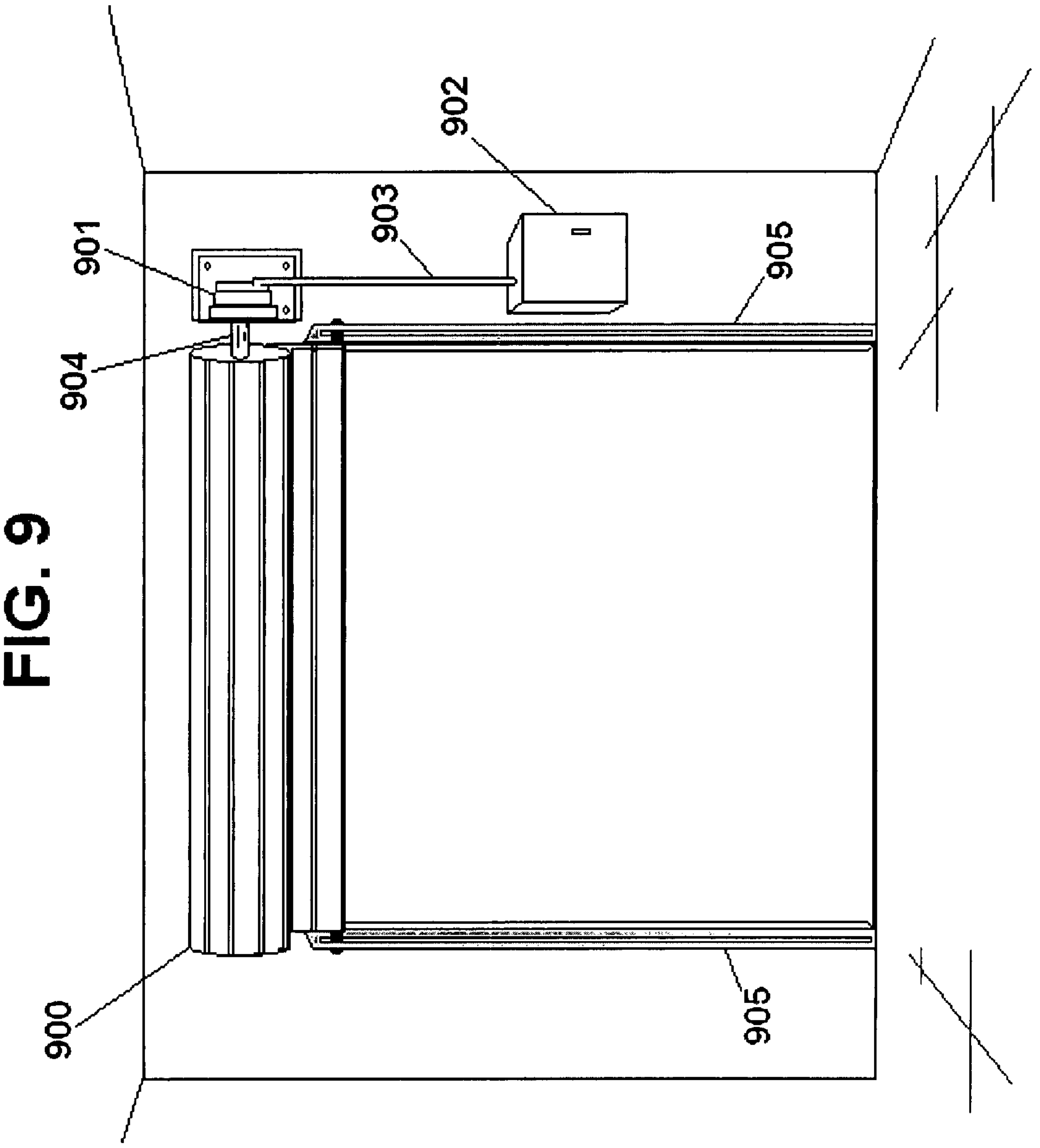
FIG. 9 illustrates yet another embodiment in accordance with the present invention wherein a movable barrier operator is installed directly to another type of barrier, by way of example a roll-up gate, without the need for gears or belt systems to optimize actuation and preserve space.

FIG. 9 illustrates yet another embodiment in accordance with the present invention wherein a movable barrier operator is installed directly to a barrier's drive mechanism, for example a roll-up gate, without the need for gears or belt systems to optimize actuation and preserve space.

One of the advantages of gearless operation of a movable barrier, in accordance with the present invention, is the versatility of its applications. Normally a roll-up door such as roll-up door 900 must use beltway systems or a gearbox in order for a conventional motor to properly and smoothly actuate door 900. And even with the use of conventional gear systems to move such barriers, actuation and operation is often rough due to the low torque at slow speeds. Such conventional means of moving a barrier need additional components in order to control the frequency of a voltage fed to a conventional motor.

Without the use of any gear box, Lorentz motor 901 may be mounted and installed directly into door 900's main drive mechanism with few modifications. The remaining equipment would only comprise conduit 903 to provide communication and power from controller 902, where users may monitor and control door 900's operation. Upon actuation, door 900 may be rolled up or rolled down, being held in place and guided by tracks 905, from a close position to an open position and vice-versa.

Lorentz force motors in accordance with the present invention are a gearless motor that uses electromagnetic properties to create mechanical work with minimal energy loss. These motors offer very high torque at very low speeds thus making these motors ideal tools to implement with a movable barrier operation system.

A gearless movable barrier operator in accordance with the present invention can be any system that controls a barrier to an entry, an exit, or a view, utilizing Lorentz force motors. The barrier could be a door for a small entity (i.e. a vehicle), or a gate for a large entity (i.e. a building), which can swing out, slide open, fold or even roll upwards.

A gearless movable barrier operator in accordance with the present invention may be implemented in a variety of embodiments for a wide range of applications. For example, and without limiting the scope of the present invention, a gearless movable barrier operator in accordance with the present invention may be a swing gate operator, a window operator, a garage door operator, a slide gate operator, a roll-up door operator, a sliding-door operator, a regular door operator, a revolving door operator, a vehicular door operator, or a vehicular top operator (e.g. a top for a convertible vehicle).

Furthermore, this disclosure does not necessarily exclude the implementation of any type of gearing system in conjunction with a gearless movable barrier operator as defined herein, however, the reduction of parts, reduced maintenance, and all other advantages served by a completely gearless system is desirable. Thus, an embodiment in which some type of gearing system is implemented with a gearless Lorentz force motor does not deviate from the scope of the present invention.

A system for high-torque/low speed gearless operation of a movable barrier has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching. It is intended that the scope of the invention not be limited by this detailed description, but by the claims and the equivalents to the claims.

What is claimed is:

1. A method for gearless operation of a slide gate capable of high torque actuation at slow speeds, comprising:

adapting a frame member to support a Lorentz force motor;

attaching said Lorentz force motor directly to a slide gate so that said swing gate moves at a substantially similar speed as a rotation speed of said Lorentz force motor;

adapting a controller to control said rotation of said Lorentz force motor;

connecting a sensor to said controller, said sensor adapted to generate a signal after detecting a predefined event;

retrofitting said Lorentz force motor with a sprocket, wherein said sprocket is rotably coupled to said Lorentz force motor;

attaching a chain to said sprocket;

attaching an idle wheel for maintaining said chain mechanically connected to said sprocket, wherein said chain runs parallel to a track, and wherein said chain is adapted to transfer a mechanical force generated by said Lorentz motor to said slide gate; and adapting said slide gate to move on said track.

* * * * *